Dec. 8, 1970 — R. C. RICHTER — 3,545,301
STEPPING MOTOR DAMPER
Filed June 2, 1969
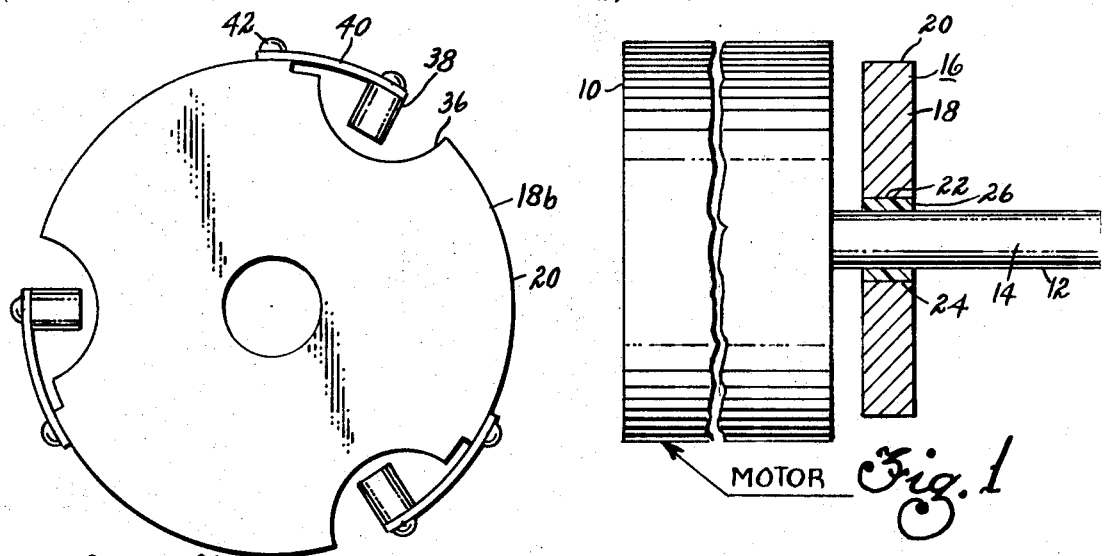
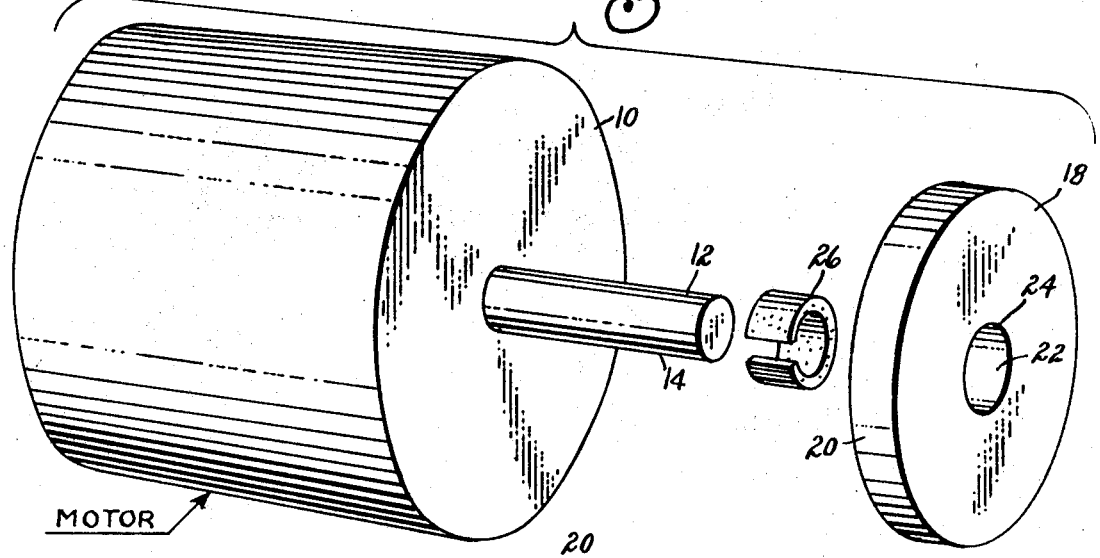
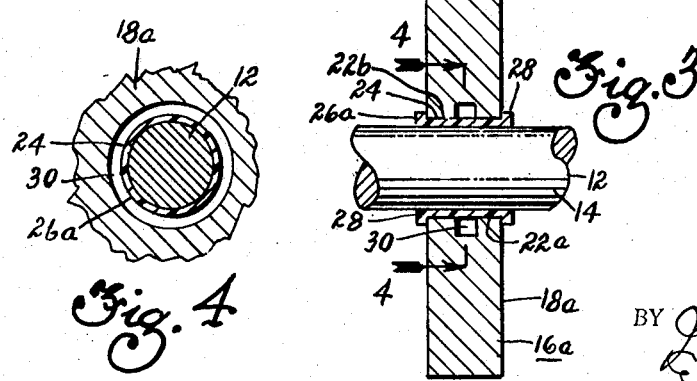
INVENTOR.
ROBERT C. RICHTER
BY Jack J. Earl
Ernst H. Ruf
ATTORNEYS ered stepping 8, 1970

3,545,301
STEPPING MOTOR DAMPER
Robert C. Richter, Cincinnati, Ohio, assignor to Cincinnati Milacron Inc., Cincinnati, Ohio, a corporation of Ohio
Filed June 2, 1969, Ser. No. 829,604
Int. Cl. F16f *15/12*
U.S. Cl. 74—574                                            11 Claims

ABSTRACT OF THE DISCLOSURE

A vibration damper for mounting on the output shaft of an electrical stepping motor wherein a viscoelastic absorber element is fixedly interposed between the motor output shaft and a damping mass, with the polar mass moment of inertia of the latter being a function of the polar mass moment of inertia of the motor armature.

BACKGROUND OF THE INVENTION

Field of the invention

This invention relates to torsional tuned, damped, vibration absorbers, particularly for mounting on the output shafts of electrical stepping motors.

Description of the prior art

Electrical stepping motors have an inherent control problem that results in a complete loss of output torque and position memory at or near certain discrete stepping rates. The cause of this problem is believed to be the excitation of a rotational mechanical resonance by the induced stepping rate. The angular step response of stepping motors exhibits an exponential decay curve characteristic of a single degree of freedom system having a low damping ratio. The decay time required to "ring out" the system is not a serious problem until the elapsed time between steps is reduced for high speed operation. When these high speed applications require stepping speeds at or near the natural frequency of the motor, the performance is generally found unacceptable.

In order to reduce the decay time, some method of damping is required. If the motor is allowed to continue as a single degree of freedom system, the required damping could be added by resorting to an electrical generator within the motor to generate a back E.M.F. or, mechanically, a viscous paddle could be added to put a "drag" force on the rotor proportional to relative angular velocity. Also, a commercially available Lancaster type flywheel damper could be used. In all three of the above solutions however, the damping added to decrease the decay time, also reduces the stepping performance by putting a drag force on the shaft proportional to the angular rotation or the change in angular rotation.

SUMMARY OF THE INVENTION

In accordance with this invention the solution to the above detailed problem is the application of a torsional tuned, damped, vibration absorber to the output shaft of the motor. "Dampers" of this type are normally applied to increase the steady state dynamic rigidity of systems exposed to sinusoidal inputs. This particular application, however, reduces the rotational dynamic displacement or excursion at the natural frequency of the motor for step inputs at any frequency. The step response of a tuned, damped, absorber system is normally considered excessive due to the relative lack of improvement on the first step. In the case of the stepping motor, however, this initial step responsive characteristic is a desirable requirement. It has been determined that the initial step response of a single degree of freedom system is not changed greatly by the application of a tuned, damped, vibration absorber. This is a desirable characteristic in a stepping motor since stepping speed is not impaired while the ringing is greatly reduced. The first wave response is not impaired, but subsequent waves are damped to reduce the "ringing out" time.

In summary, this invention provides a torsional tuned, damped, vibration absorber mounted on the output shaft of an electrical stepping motor and includes an annular damping mass and a viscoelastic absorber element interference-fitted between the damping mass and the stepping motor output shaft. While detailed studies of the damper requirements for stepping motors have led to design specifications which provide acceptable performance commensurate with a conservative margin of control, these design parameters cannot be truly optimized because of the main system variation introduced by the electrical "driver" circuit. In general, however, the damper polar mass moment of inertia should be about 50% of the polar mass moment of inertia of the motor armature. In addition, annular damping masses having variable polar mass moments of inertia may be utilized.

BRIEF DESCRIPTION OF THE DRAWINGS

FIG. 1 is a plan view partly in section showing the elements of this invention attached to a stepping motor.
FIG. 2 is an exploded view of this invention.
FIG. 3 is a sectional view of a modified embodiment of this invention.
FIG. 4 is a sectional view taken along line 4—4 of FIG. 3.
FIG. 5 is an end view of a modified element of this invention.

DESCRIPTION OF THE PREFERRED EMBODIMENT

Referring now to the drawings in detail, FIGS. 1 and 2 depict an electrical stepping motor 10 having rotatable output shaft 12 with peripheral surface 14. Mounted on output shaft 12 is torsional, tuned, damped vibration absorber or damper 16 made up of generally annular damping mass 18, with outer and inner peripheral surfaces 20, 22 respectively, central bore 24, and viscoelastic absorber or damping element 26, said element being fixedly interposed or interference-fitted between motor output shaft peripheral surface 14 and damping mass inner peripheral surface 22. Damping element 26 is a flat strip of viscoelastic material wrapped around shaft surface 14 and held in constant strain preload by the inside diameter or inner peripheral surface 22 of damping mass 18. The interference strain may, for example, be 0.0125 inch per side (or 0.025 inch on the diameter).

The modified vibration absorber 16a of this invention shown in FIGS. 3 and 4 is very similar to the previously described structures and basically, instead of using strip-type viscoelastic damping element 26 of FIGS. 1 and 2, utilizes sleeve or grommet-type viscoelastic damping element 26a, having lips 28 engaging the sides of damping mass 18a to prevent relative axial movement between the damping element and the damping mass. Damping mass 18a is identical with damping mass 18 except for the addition of inner annular groove 30 which modifies inner peripheral surface 22 of FIGS. 1 and 2 into generally identical surfaces 22a and 22b. In addition to the primary function of groove 30, which will be discussed later, the creation of the two surfaces 22a, 22b helps to reduce any wobbling tendencies between damping mass 18a and damping element 26a, with the latter again being interference-fitted between damping mass surfaces 22a, 22b and motor shaft surface 14.

FIG. 5 shows a modification 18b of previously described damping mass 18 or 18a, wherein outer peripheral surface 20 has a plurality of arcuate recesses 36 and extending freely into said recesses are flyweights 38 which are elastically held by spring means 40 having one end rigidly attached, such as by bolts 42, to surface 20. Again, the function of flyweights 38 will be discussed later.

In order to maintain proper control, a stepping motor, such as motor 10, must never "jump null." If for example, a stepping motor is of the 200 steps per revolution configuration the angular displacement between steps is therefore 1.8 degrees and because if for example, the permanent magnet armature of the motor has 50 teeth, there are 50 "null" positions for any given set of field coil excitation conditions, and thus four steps (7.2 degree angular displacement) between nulls. Changing the field coil excitation configuration moves the null position in the stator in order to move the stepping motor output shaft. There are four possible field coil excitation configurations. The stepping motor will jump to an adjacent null, however, if the dynamic torsional oscillation excursion exceeds a four step peak-to-peak amplitude. Experimentally it has been found that a three step peak-to-peak amplitude is nearly always unstable. If for any reason during operation the stepping motor output shaft, such as shaft 12, should get ahead of or behind the synchronous traveling true position by two increments or 1/100 turn, the position memory and control will be lost because the motor will have jumped to a new null position.

Stepping motor performance is affected by both low and high frequency problems. In relation to the low frequency problem, the slope of the stepping motor holding torque curve can be thought of as the rigidity of a single degree of freedom torsional system. This rigidity versus the polar mass moment of inertia of the motor armature (information that is generally supplied by the motor manufacturer) produces a predictable natural frequency for the motor. If the stepping rate is slightly lower than this natural frequency the armature shaft (output shaft 12) will rotate at the desired stepping rate but will also oscillate in rotation through a dynamic excursion amplitude determined by the rather low characteristic damping in the torsional system. As the frequency of the stepping rate is increased, to exactly equal the natural frequency of the motor the excursion amplitude increases to a magnitude of three steps whereupon, control is lost and the stepping motor produces no torque and stops running. The amplification factor, or inversely, the damping ratio is determined by the impedance match between the stepping motor driver circuit and the exact dynamics of the particular stepping motor.

In addition to the above, stepping motors also have high frequency problems in the form of structural resonance conditions wherein the armtures rock in their support bearings. If this rocking mode of the armature remains excited by the stepping rate for a sustained period of time (a few seconds), the low frequency torsional resonance becomes excited. When the dynamic excursion of this lower mode exceeds three steps peak-to-peak amplitude, control is lost, the stepping motor stops turning, and refuses to restart because the stepping frequency is now higher than the maximum starting frequency.

It has been determined that the control specification data as supplied by the stepping motor manufacturer can be used to calculate the design parameters for vibration damper 16 or 16a. The polar mass moment of inertia of damping mass 18, 18a, or 18b is taken to be in the range of 10 to 60 percent (preferably 50%) of that of the motor. Naturally as this damping mass ratio is increased, the speed of response is decreased. The slope of the "holding torque" curve for the rated current is used as the torsional spring constant. This value is required along with the polar mass moment of inertia of the motor in order to determine the mechanical natural frequency of stepping motor 10 in torsion which may be determined according to the following equation:

$$f_n = \frac{1}{2\pi}\sqrt{\frac{K_T}{J}}$$

where:

$f_n$ = natural frequency of the motor (10)
$K_T$ = torsional rigidity of the motor (10)
$J$ = polar mass moment of inertia of the motor (10)

The torsional rigidity of viscoelastic absorber element 26 or 26a required for proper tuning must be calculated knowing in general the geometric configuration of the final design. These damping elements, as previously described, are interference-fitted between damping mass surfaces 22, or 22a, 22b and motor shaft surface 14. The torsional rigidity ($K_T$) of absorber element 26 or 26a may be determined according to the following equation;

$$K_T = 4\pi G' \left(\frac{r_o^2 r_i^2}{r_o^2 - r_i^2}\right) X$$

where:

$K_T$ = torsional rigidity of the absorber element (26)
$r_i$ = radius of stepping motor output shaft (12)
$r_o$ = radius of damping mass bore (24) ($r_i + 0.050$)
$G'$ = frequency dependent elastic shear modulus
$X$ = effective land width These previously stated problems are solved by the addition of torsional tuned damped absorber 16 or 16a to stepping motor output shaft 12. The design of these absorbers must be such so as to eliminate both the low and high frequency problems. In respect to the high frequency problem, the structural resonance in the motor at high frequency is disturbed by the pulsing frequency which in turn disturbs the lower frequency torsional mode of the stepping motor armature.

The torsional natural frequency is affected by the instantaneous speed of the motor and decreases as motor speed increases. The solution is to use damped absorber 16 or 16a for the torsional motor vibration as previously described but it must also be effective at the slightly lower frequency which results from rotating at this higher speed, i.e., the mass ratio of damped absorber 16 or 16a must have a sufficient band width so as to be effective for the full variation in the torsional natural frequency.

FIG. 5 shows modified damping mass 18b utilizing spring-held flyweights 38. During rotation, the increasing centrifugal force causes flyweights 38 to move outwardly and away from damping mass 18b, thereby changing its polar mass moment of inertia with respect to speed; i.e., it increases as the rotational speed increases thus lowering the natural frequency of vibration absorbers 16 or 16a, which is desirable since, as previously noted, the natural frequency of the stepping motor decreases as its rotational speed increases. Thus, in the FIG. 5 embodiment the polar mass moment of inertia of damping mass 16b decreases, thereby lowering the natural frequency of vibration absorber 16 or 16a to substantially agree with the natural frequency of stepping motor 10 which changes with speed of rotation because of the back E.M.F. generated in the coils by the instantaneous rotation of the armature.

Since the stiffness of damping elements 26 or 26a is not an exact linear function of band width it is recommended that this band width be used in two sections (surfaces 22a, 22b) with the center relieved (groove 30 as shown in FIG. 3). This prevents wobble and the exact width of groove 30 can be determined experimentally for each new stepping motor design.

While this invention has been described in connection with possible forms or embodiments thereof it is to be understood that the present disclosure is illustrative rather than restrictive and that changes or modifications may be resorted to without departing from the spirit of the invention.

What is claimed is:
1. A vibration damper for mounting on the output shaft of an electrical stepping motor comprising:
   (a) a damping mass;
   (b) a damping element fixedly interposed between the motor output shaft and said damping mass.
2. A torsional tuned damped vibration absorber mounted on the output shaft of an electrical stepping motor comprising:
   (a) an annular damping mass;
   (b) a viscoelastic absorber element interference-fitted between said damping mass and the stepping motor output shaft.
3. The vibration absorber of claim 2 wherein the polar mass moment of inertia of the damping mass is a function of the polar mass moment of inertia of the motor armature.
4. The vibration absorber of claim 2 wherein the polar mass moment of inertia of the damping mass is from 10 to 60 percent of the polar mass moment of inertia of the motor armature.
5. The vibration absorber of claim 2 wherein the polar mass moment of inertia of the damping mass is about 50 percent of the polar mass moment of inertia of the motor armature.
6. The vibration absorber of claim 2 wherein the viscoelastic absorber element is a flat strip of viscoelastic material wrapped around the output shaft of the motor and held in a constant strain preload by said damping mass.
7. The vibration absorber of claim 6 wherein the torsional rigidity ($K_T$) of said viscoelastic absorber element is substantially equal to

$$4\pi G'\left(\frac{r_o^2 r_i^2}{r_o^2 - r_i^2}\right)X$$

8. The vibration absorber of claim 2 wherein said viscoelastic absorber element is of generally annular shape.
9. The vibration absorber of claim 2 wherein said annular damping mass has a variable polar mass moment of inertia.
10. The vibration absorber of claim 9 wherein the polar mass moment of inertia said damping mass varies as a function of the stepping motor speed.
11. The vibration absorber of claim 10 wherein said annular damping mass utilizes a plurality of elastically attached flyweights.

References Cited
UNITED STATES PATENTS

| | | | |
|---|---|---|---|
| 3,296,888 | 1/1967 | Schweitzer | 74—574 |
| 3,453,465 | 7/1969 | De Boer et al. | 310—49 |

FRED C. MATTERN, Jr., Primary Examiner

F. D. SHOEMAKER, Assistant Examiner

U.S. Cl. X.R.
310—51, 74